(12) United States Patent
Daley, III

(10) Patent No.: US 7,894,179 B2
(45) Date of Patent: *Feb. 22, 2011

(54) BAG COMPUTER DISPLAY PANEL

(76) Inventor: Charles A. Daley, III, PO Box 184, Karon PO, T, Karon A. Muang, Phuket (TH) 83100

( * ) Notice: Subject to any disclaimer, the term of this patent is extended or adjusted under 35 U.S.C. 154(b) by 176 days.

This patent is subject to a terminal disclaimer.

(21) Appl. No.: 12/216,651

(22) Filed: Jul. 9, 2008

(65) Prior Publication Data

US 2008/0273298 A1 Nov. 6, 2008

Related U.S. Application Data

(63) Continuation-in-part of application No. 11/796,920, filed on May 1, 2007, now abandoned, and a continuation-in-part of application No. 11/799,011, filed on May 1, 2007, now abandoned.

(60) Provisional application No. 60/962,315, filed on Jul. 30, 2007, provisional application No. 60/962,316, filed on Jul. 30, 2007, provisional application No. 61/125,861, filed on Apr. 30, 2008, provisional application No. 61/128,296, filed on May 21, 2008.

(51) Int. Cl.
*G06F 1/16* (2006.01)
(52) U.S. Cl. ............... 361/679.03; 361/679.55; 206/320
(58) Field of Classification Search ........... 361/679.03, 361/679.55; 206/320
See application file for complete search history.

(56) References Cited

U.S. PATENT DOCUMENTS

| | | | |
|---|---|---|---|
| 5,445,266 A * | 8/1995 | Prete et al. | 206/320 |
| 5,887,723 A * | 3/1999 | Myles et al. | 206/760 |
| 6,167,413 A * | 12/2000 | Daley, III | 708/139 |
| 6,269,948 B1 * | 8/2001 | Jackson | 206/320 |
| 6,283,299 B1 * | 9/2001 | Lee | 206/760 |
| 6,763,942 B1 * | 7/2004 | Yeh | 206/320 |
| 6,956,614 B1 * | 10/2005 | Quintana et al. | 348/373 |
| 6,962,277 B2 * | 11/2005 | Quintana et al. | 224/262 |
| 7,265,970 B2 * | 9/2007 | Jordan | 361/679.27 |
| 2005/0011920 A1 * | 1/2005 | Feng | 224/275 |
| 2005/0103815 A1 * | 5/2005 | Lee et al. | 224/275 |
| 2006/0113213 A1 * | 6/2006 | Daley, III | 206/576 |
| 2006/0163303 A1 * | 7/2006 | Trutanich | 224/576 |
| 2007/0199844 A1 * | 8/2007 | Daley, III | 206/320 |
| 2007/0201201 A1 * | 8/2007 | Daley, III | 361/683 |
| 2008/0192421 A1 * | 8/2008 | Daley | 361/681 |
| 2009/0009476 A1 * | 1/2009 | Daley, III | 345/168 |
| 2009/0009938 A1 * | 1/2009 | Daley, III | 361/680 |
| 2009/0046416 A1 * | 2/2009 | Daley, III | 361/679.55 |

(Continued)

*Primary Examiner*—Lisa Lea-Edmonds

(57) ABSTRACT

Disclosed is a panel-like display meant for pivotally mounting near the top front corner of a matching bag by one edge so it can be pivoted into the line of sight of the bag wearer. It may electrically connect to the bags interior or may include its own computing unit. The display panel may be attached to the bag with a display edge clamp meant to match a short flap near the top front corner of a matching bag. The display panel may include an input device, such as a touch pad, and this may be on the back side of the panel opposite the display. The panel may be split in two parts with separate display and touch pad components on the separate part. The display back side may also have fixtures to match a bag front display prop which holds the display at various angles.

39 Claims, 8 Drawing Sheets

U.S. PATENT DOCUMENTS

| | | | |
|---|---|---|---|
| 2009/0107877 A1* | 4/2009 | Daley, III | 206/576 |
| 2009/0107878 A1* | 4/2009 | Daley, III | 206/576 |
| 2009/0141446 A1* | 6/2009 | Daley, III | 361/679.55 |
| 2009/0185342 A1* | 7/2009 | Daley, III | 361/679.27 |
| 2009/0190296 A1* | 7/2009 | Daley, III | 361/679.27 |
| 2009/0201637 A1* | 8/2009 | Daley, III | 361/679.29 |
| 2009/0225508 A1* | 9/2009 | Daley, III | 361/679.27 |
| 2009/0225509 A1* | 9/2009 | Daley, III | 361/679.29 |
| 2009/0236247 A1* | 9/2009 | Daley, III | 206/320 |
| 2009/0284908 A1* | 11/2009 | Daley, III | 361/679.17 |

* cited by examiner

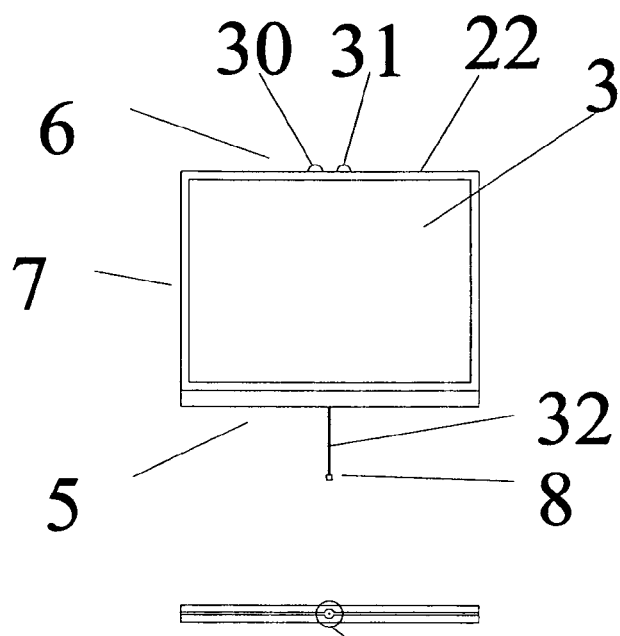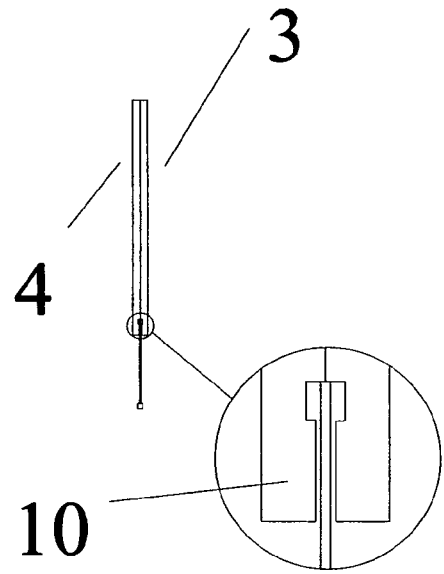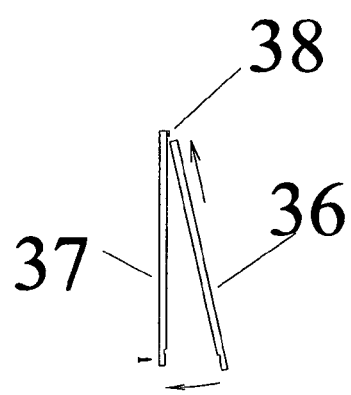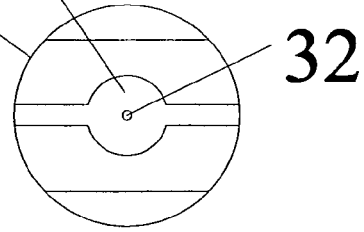

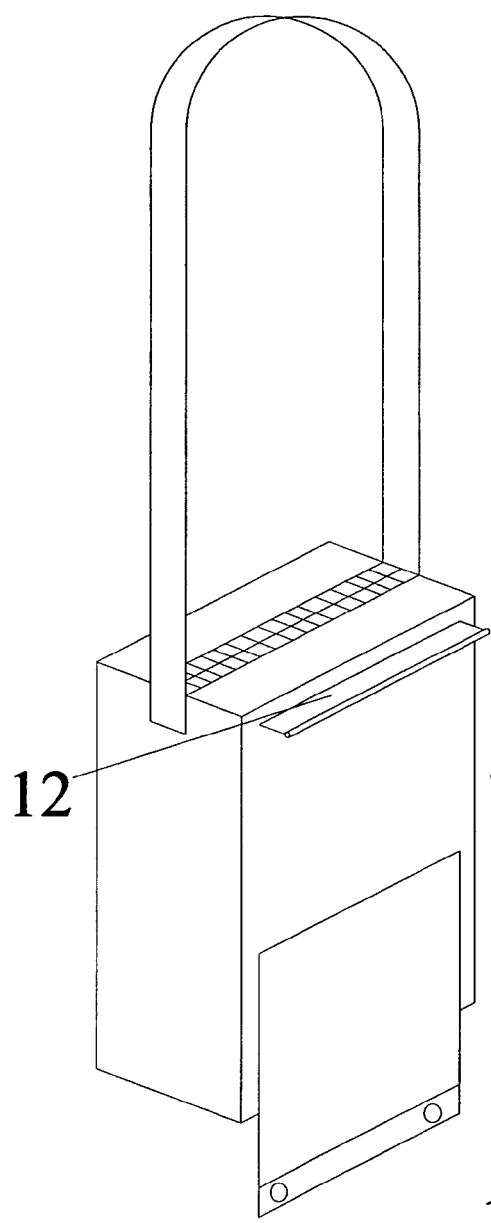
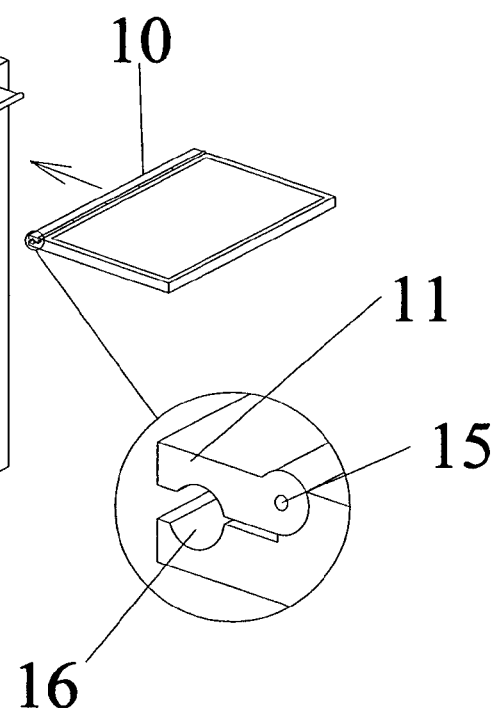
FIG. 6A          FIG. 6B
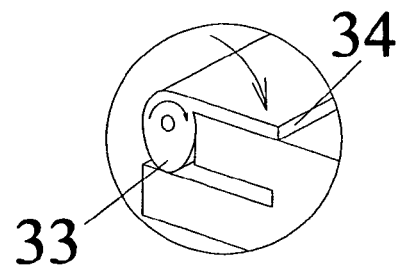
FIG. 7

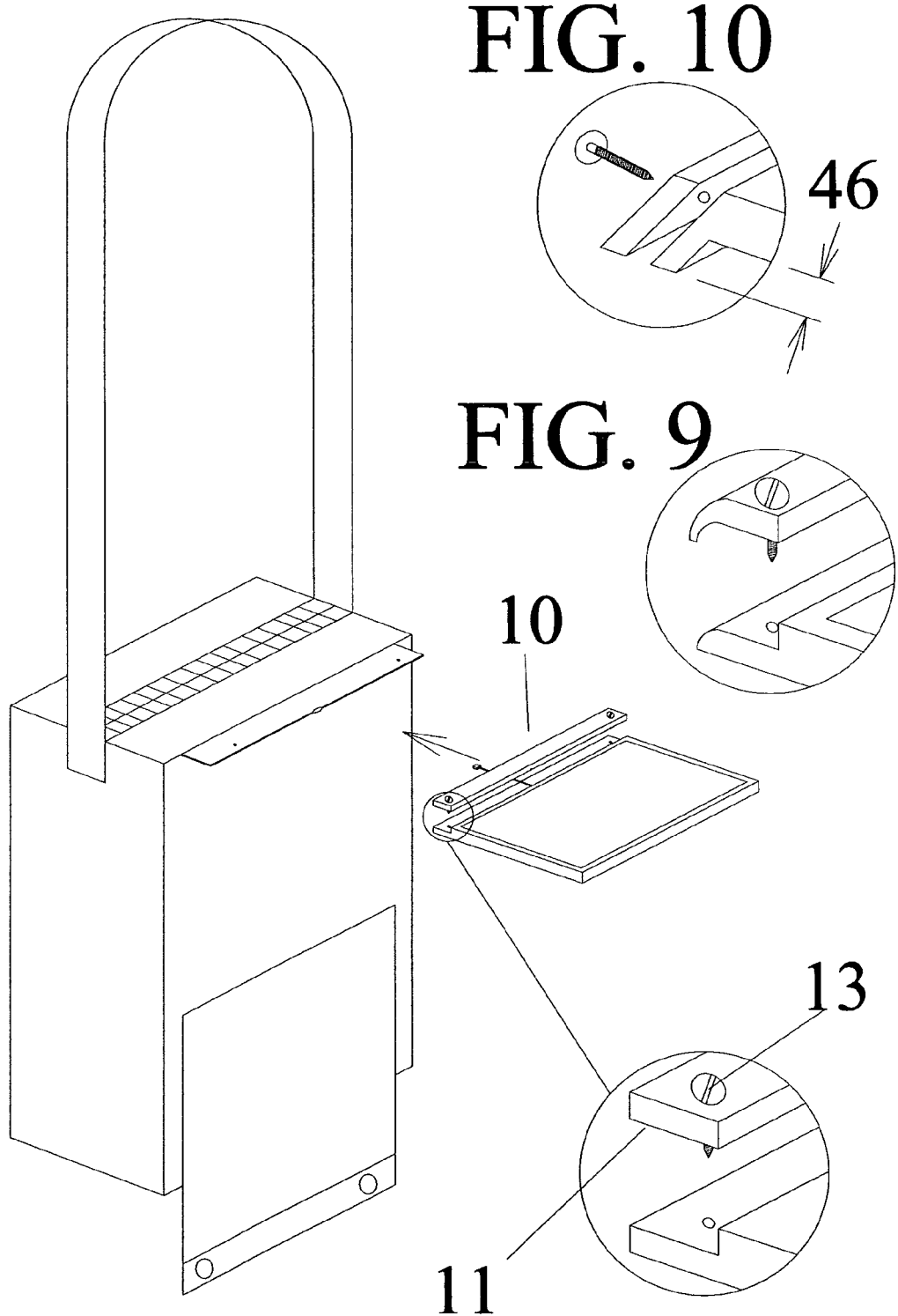

BAG COMPUTER DISPLAY PANEL

CROSS-REFERENCE TO RELATED APPLICATIONS

This application is a Continuation-In-Part and claims the filing benefit under 35 U.S.C. §120 of pending U.S. application Ser. No. 11/796,920, filed May 1, 2007 now abandoned and is incorporated herein by reference.

This application is a Continuation-In-Part and claims the filing benefit under 35 U.S.C. §120 of pending U.S. application Ser. No. 11/799,011, filed May 1, 2007 now abandoned and is incorporated herein by reference.

This application claims the filing benefit under 35 U.S.C. §119(e) of U.S. Provisional Application No. 60/962,315, filed on Jul. 30, 2007, the entire teachings of which are incorporated herein by reference.

This application claims the filing benefit under 35 U.S.C. §119(e) of U.S. Provisional Application No. 60/962,316, filed on Jul. 30, 2007, the entire teachings of which are incorporated herein by reference.

This application claims the filing benefit under 35 U.S.C. §119(e) of U.S. Provisional Application No. 61/125,861, filed on Apr. 30, 2008, the entire teachings of which are incorporated herein by reference.

This application claims the filing benefit under 35 U.S.C. §119(e) of U.S. Provisional Application No. 61/128,296, filed on May 21, 2008, the entire teachings of which are incorporated herein by reference.

TECHNICAL FIELD

The present invention relates to a mobile computer meant to be operated while mounted on a computer bag.

BACKGROUND OF THE INVENTION

Bag computers are meant for use in the mobile environment. Bag computers are composed of a bag and computer joined so that the display panel pivots on a horizontal axis around the top front end of the bag so it can lay approximately flat against the bag front when stored or pivot with its display facing outward into the line of sight of the operators when in use. With the display so positioned, more operating position and greater versatility are possible. The computing unit may be outside of, inside of or combined with the bag's front wall or may be combined with the display unit. Manual computer inputs, such as a pointing device and/or keyboard, are also found on the bag front either combined with the display or the computer or as a separate unit. The back side of the display, the facing away from the operator's line of sight, may also be used as a venue for a pointing device or other controls so the operator can control the computer while holding the display panel.

One means of removable and pivotally attaching the display panel to the bag is to use a pivoting flexible fabric attachment flap fixed to the bag exterior near the junction of the front and top bag walls and made of, for example, bag material, to which the display panel is clamped, slid, clipped, etc. Flap mounts are simple and light. The flap mount allows the use a greater variety of components, such as the bag, display, touch pad, keyboard and computing unit and can have advantages over bags using a computer with these components combined in terms of manufacturing diversity and rights. Using a clamp attachment on the display panel component is an improvement in this regard. The use of pivoting flap attachments also generates the need for a display angle position holding capability such as a display panel prop and the display must be adapted to fit this improvement.

Bag computers, including ones using attachment flaps, were described in U.S. patent application Ser. Nos. 11/796,920 and 11/799,011 and this application is an improvement on them.

BRIEF SUMMARY OF THE INVENTION

Disclosed is a piece of computer equipment made for pivotally mounting near the top front corner of a matching bag and composed of a panel with at least a display which faces away from the bag front when hanging on the bag front. The display panel may have an electrical connection for connecting to a computing unit inside the bag. The display panel may be divided into removably securable front and back side parts which include a display or pointing device, respectively. The display back may include fixtures to match a display panel prop to hold the display in desired angular positions. One edge of the panel has an attachment to match a hinge means attachment, such as a flap or flange from an axle bearing hinge, mounted on a bag near the junction of the front and top bag walls. The edge may include an electrical connection to connect to other computing equipment inside the bag. The display panel may instead include the computing unit, batteries and other equipment to make the display panel a self contained computer.

The attachment on the display panel edge may be a clamp to match a flexible fabric attachment flap or pivoting flat flange on the bag. The clamp may have two jaws molded as one with a clip, screw or pins tightening the clamp grip. There may be two separate jaws which may be hinged together or removable with screws, clamps or pins fixing they together. The jaws of the clamp may be shaped to fit the bag hinge means. They may have a channel, knurling, teeth or other shaping.

The display/computer panel may have a hinge means, such as flexible fabric or axle/bearing with flange, attached to one edge which matched an attachment on the bag such as the jaws of a clamp fitted to the bag front. The edge of the hinge means may be plain or may have an edge bar or other ledge, or holes to match the bag's clamp jaws.

BRIEF DESCRIPTION OF THE SEVERAL VIEWS OF THE DRAWING

FIG. 2A This is a front plan view of the removable display with clamp attachment for connecting the display to the bag front pivoting attachment.

FIG. 2B This is a side plan view of the removable display with clamp attachment.

FIG. 2C This is a plan view of the proximal attachment edge of the removable display panel.

FIG. 2D This side plan view of the removable display with clamp attachment shows the optional separate display and input device (eg touch pad) panels and how they fit together.

FIG. 2E This is a magnified view of the clamp and electrical connection area as shown in FIG. 2B.

FIG. 2F This is a magnified view of the clamp and electrical connection area on the proximal attachment edge of the display shown in FIG. 2C.

FIG. 6A This is the removable display with clamp attachment shown ready to attachments to a bag front flap attachment.

FIG. 6B This is a magnified view of the clamp jaw area of the display with clamp attachment. The jaws are in two pieces hinged together.

FIG. 7 This is a magnified view of the clamp jaw area of the display with alternate lever and cam eccentric clamp mechanism.

FIG. 8A This is the removable display with clamp attachment shown ready to attachments to a bag front flap attachment.

FIG. 8B This is a magnified view of the clamp jaw area of the display with clamp attachment. The jaws are in two pieces with one of the jaws removable.

FIG. 9 This is a magnified view of the clamp jaw area of the display with clamp attachment with an alternative jaw configuration. The jaws are curved and in two pieces with one of the jaws removable.

FIG. 10A This is the removable display with a flexible fabric hinge means on its attachment edge and meant to be held to the bag with a bag front clamp.

DETAILED DESCRIPTION OF THE INVENTION

Figure 1A:
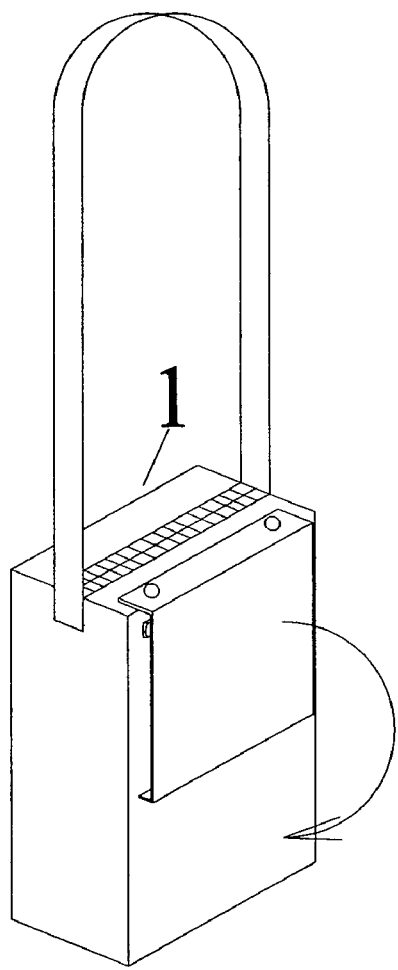
FIG. 1A This drawings shows a bag computer with the display and keyboard in stored position.
Figure 1B:
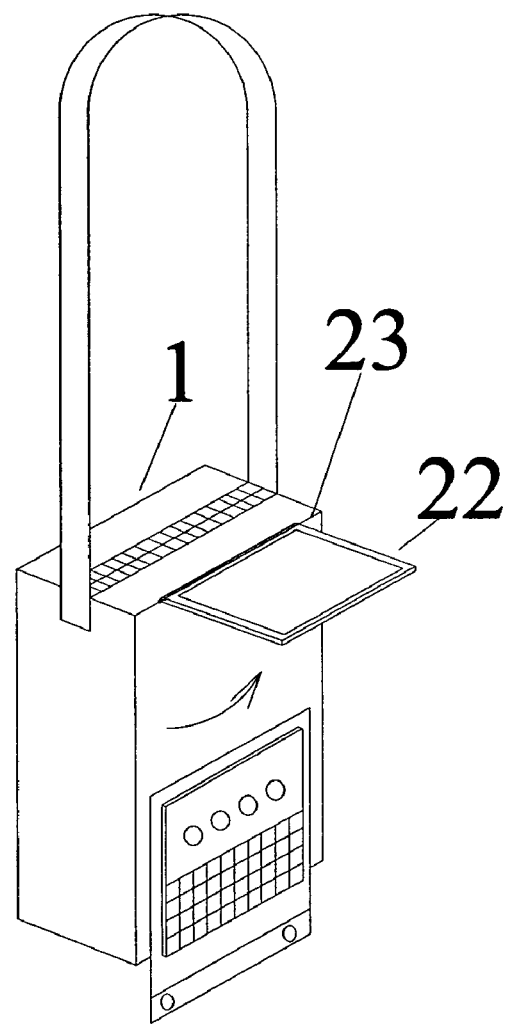
FIG. 1B This drawings shows a bag computer with the display and keyboard in operating position with the display in the line of sight of the operator/wearer.

As shown in FIGS. 1A and 1B the bag computer consists of a bag 1 with a shoulder strap for wearing and a display 22 pivotally mounted to the area near the junction of the front and top bag walls 23 so that the display panel can be pivoted from a stored position (FIG. 1A) approximately flat against the bag front to an operating position (FIG. 1B) in the line of sight of the operator/wearer. The bag computer may be seen as a wearable computer and accessing the interior of the bag to operate the computer is not required. The interior of the bag may be used for storage of general cargo or peripherals and access to peripheral mounts and plugs or possible via the interior of the bag. The computing unit for the bag computer may also be found in the display panel or it may be found elsewhere in the bag. The display panel may also have manual controls, such as a pointing device, on/off switch or scroll mechanism, on any of its sides or edges so that the operator can control the computer from the display panel. A pointing device, such as a touch pad, located on the back side of the display panel allows the operator to access a large control surface with his fingers without diminishing the display size. To allow the computer and bag to be replaceable, upgradeable or to change style, the display panel is designed to be removably fixed to the bag front. The bag computer allows the use of a display large enough for standard Windows programming, standard internet and allows the use of standard keyboard keys. A display back touch pad is bigger than in most computers.

As shown in FIGS. 2A, 2B, 2C, 2D, 2E and 2F the bag computer display panel 22 is thin and approximately rectangular in shape. It has a front side 3 facing up when the input device is pivoted perpendicular to the bag's front wall, a back side 4 opposite the front side, a proximal attachment edge 5 closest to the bag's front wall when the input device is pivoted perpendicular to the bag's front wall, a distal edge 6 opposite the proximal edge and two side edges 7. The display panel may have an interior space to contain electronic equipment. The display is located on the front side and oriented for viewing by the wearer when pivoted away from the bag's front side into operating position. The display panel may include a computing unit. The display panel body may have an electrical connection 8, to electrically connect the display, manual controls and other features on the display panel with the computing unit or peripheral inside the bag.

For operation/viewing, the display panel pivots on the bag by its proximal attachment edge using a pivoting computer equipment mount. A pivoting computer equipment mount is a fitting to removably attach the display panel and bag together while allowing them to pivot relative to each other on a horizontal axis. It consists of one part on the display panel proximal attachment edge 10 and a matching part on the bag. Instead of one pivoting computer equipment mount there may be right and left pivoting mounts on the same axis. The pivoting computer equipment mount may be, for example; an axle bearing hinge on either the display panel or bag matching an complimentary attachment and hold the display panel and bag together; a half hinge bearing or axles with one half hinge on the display panel and the other matching half hinge on the bag; a flexible fabric attachment flap on the bag or display panel proximal attachment edge of a size shape and thickness to match a complimentary attachment, such as a clamp, and hold the display panel and bag together; a flexible fabric attachment flap on the bag or display panel proximal attachment edge with an attachment which matches a complimentary attachment and hold the display panel and bag together.

The front side of the display panel may have a small keyboard, electronic write pad, pointing device, scroll buttons or bar, speaker, microphone or other controls in addition to the display. The display may have a touch screen. On the side of the computer opposite the display there may be a pointing device, such as a touch pad, or other controls. The back side touch pad may have one or more finger guides over a touch pad to help align the operator's fingers to the touch pad without looking. The finger guides may be removable. The finger guide has a pattern of ridges and/or openings to guide the fingers to specific positions, corresponding to specific controls, on the touchpad which is underneath the finger guide. The finger guides may work with and align to programmed touchpad positions. The finger guide and programming for the touchpad may be changed together to fit particular operator needs. Bumpers may be built into the finger guides to cushion the blow if the display panel is dropped against the bag front. The display, if including a computing unit, may have batteries and be self-contained. There may be television, music player, radio, telecommunications and/or GPS. There may be additional plugs for data transfer, charging, earphones or other peripherals. The panel may have a general use input/output tool such as an infrared antenna 30 for external communication, or camera 31 located at its distal end or back side so it can be pointed to an external target. There may be a separate infrared antenna for communication with a keyboard or electronic write pad mounted on the bag front. Other controls such as a scroll mechanism/wheel may be located on the side edges.

The display panel may be tapered to be thinner and lighter at the distal end and may have heavier components, such as batteries, if present, near the bag. The display panel and attachments may be shaped to allow the panel to lay flat against the bag even if there is some bag bulge caused by cargo in the bag. Shaping may include recesses or protrusions to compensate for the thickness of the display panel prop on the bag front or to protect the display panel backside controls.

To further divide the bag computer system into components, the display panel may be divided into two parts along a plane parallel to the front 36 and back 37 sides. The front side part would include the display. The back side part would include a touch pad or other pointing device and/or controls and may include finger guides to assist the operator find particular touch points on the controls. The front display and back controls face outward when the two parts are assembled so they may be used. The two parts may be changed/replaced whenever desired. The two parts may be attached with attachments such as a hook 38, plug or socket at the distal edge and using the proximal attachments, for example a clamp, which may both connect the two halves and attach the display panel to the bag attachment flap. Instead, snaps, clips or sliding channels may be used to attach the two parts. The two parts may be attached using a finger guide frame which both holds the finger guide in place and may also hold the two display panel parts together. The finger guide frame may be part of the finger guide or a separate part and it holds the perimeter of the finger guide to the edges of the display panel parts.

The display panel may be electrically connected through the bag and its front wall to the interior so that it may be removably connected with other peripheral or the computing unit.

In the case where the computing unit is meant to be mounted elsewhere in the computer bag, the display panel may be linked to other equipment in the bag with an electrical connection 8. Electrical wiring and plug may be part of the bag or inside mounted computing unit panel with the display panel having a plug to match it.

If the display panel used a proximal attachment edge clamp attachment to attach to the bag's attachment flap, the electrical connection may be a wire 32 of an appropriate diameter and length, including plug, from the proximal attachment edge of the display panel, through the attachment area so that it may passing through an opening in the front wall of the bag and connecting with computer equipment mounted inside the bag. The wiring may be designed to pass through two layers of attachment flap material and through the front wall to the bag's interior. There may be a gap, channel, notch or other cut out 45 in the display panel's clamp area to allow an electrical connection, for example a wire with plug at the end 8, to pass from the display panel proximal attachment edge, between the clamp jaws, through an opening in two layers of the bag's attachment flap, through the bag's front wall and to the interior of the bag to connect with inside mounted computer or peripherals without pinching the wire in the clamp when it is tightened around the attachment flap. By using a wire and plug that is part of the display panel, no wiring need be included in the bag thus simplifying bag construction. A wire leading from the display panel proximal attachment edge may be positioned anywhere to match the opening in the bag's attachment flap and the electrical connection on an inside mounted computing unit.

If the display panel is divided into two parts, each part may have an electrical connection, such as a wire and/or plug or there may be a connecting plug between the two panel parts and just one wire and/or plug leading into the bag.

If the display panel includes a hinge means, such as a flexible fabric flap, the connection, for example a wire, to the bag may lead from the display panel proximal attachment edge through layers in the flexible fabric hinge means to a plug on the hinge or extending beyond the hinge means long enough to pass through the bags front wall to the bag interior where a wire end plug may connect to interior computer equipment.

In the case where the display panel is meant to be a self contained computer, the computing unit, batteries and other essential equipment may also be located in the display panel with an electrical connection, as described above, for peripherals being optional.

Figure 3A:
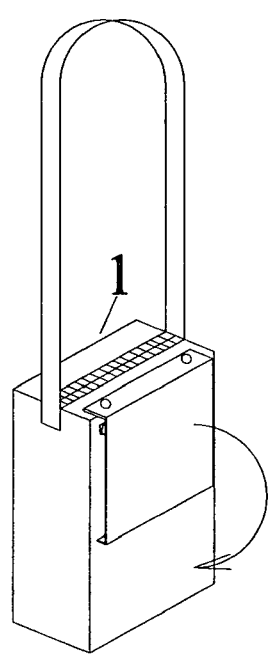
FIG. 3A This drawings shows a bag computer with the two panel display and keyboard in stored position.
Figure 3B:
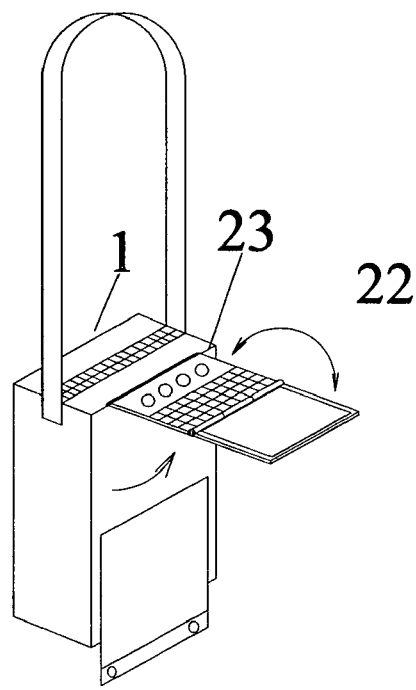
FIG. 3B This drawings shows a bag computer with the two panel display and keyboard unfolded and in operating position.
Figure 3C:
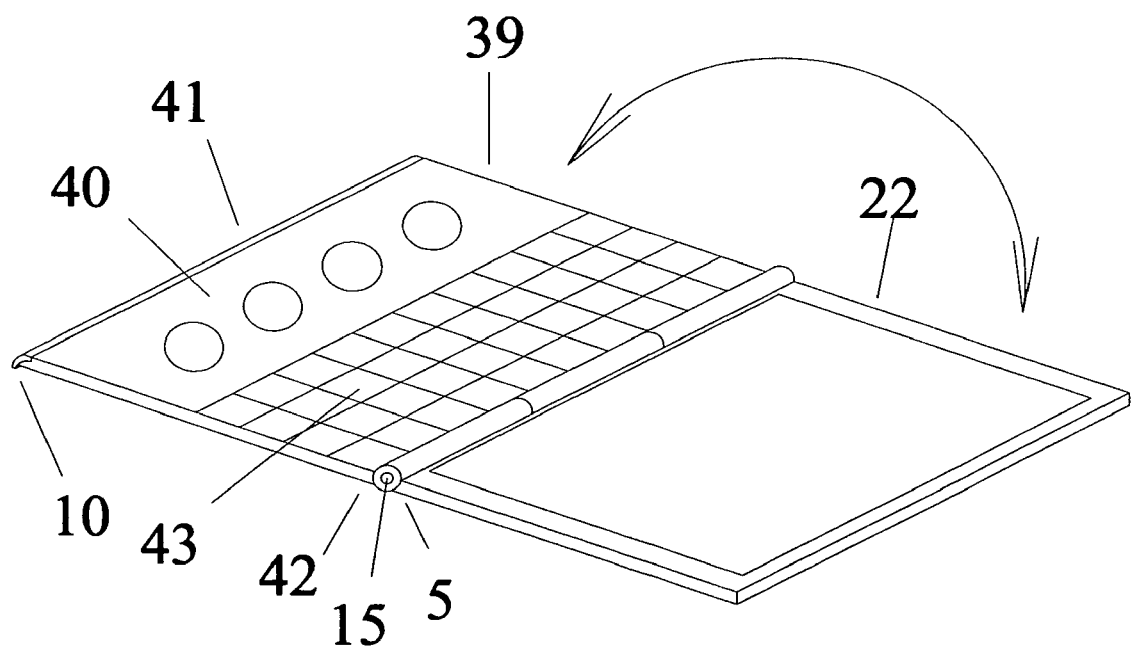
FIG. 3C This is a close up view of the two panel display and keyboard computer made for clamp mounting to a flap on the bag front.

As shown in FIGS. 3A, 3B and 3C, the display panel may become a two panel computer by placing an intermediate panel 39 between the display panel 22 proximal edge clamp attachment 10 and the display panel proximal edge 5. The intermediate panel has front 40 side facing up when the intermediate panel is pivoted perpendicular to the bag's front wall, an opposite back sides, two side edges, a proximal attachment edge 41 nearest the bag front when installed and an opposite distal edge 42. The proximal edge attachment matching the bag is fixed to the intermediate panel proximal attachment edge. The intermediate panel distal edge is pivotally attached to the display panel proximal edge using a hinge means 15. The intermediate panel may hold a computing unit and/or may have a manual input device such as a keyboard 43 or electronic write pad or other controls on its front side. There may be a pointing device on the back side of the display panel. The front side of the display panel and front side of the intermediate panel may face each other when the two panels are folded together while in stored position. The result is computer with a display panel and keyboard/computer panel connected with a hinge means in a manner similar to a lap top computer and with a pivoting computer equipment mount matching the bag found on the edge of the intermediate panel proximal attachment edge. If a proximal attachment edge clamp attachment is used, it is the same as described below for the display panel alone.

There is an electrical connection between the intermediate panel and the display panel and this passed through the hinge means that connects them. There may be an electrical connection leading from the intermediate panel proximal edge through the intermediate panel pivoting computer equipment mount and bag front wall to the interior of the bag to removably connect with computer equipment held there. Its characteristics are the same as described for a display panel alone.

Figures 4A, 4B:
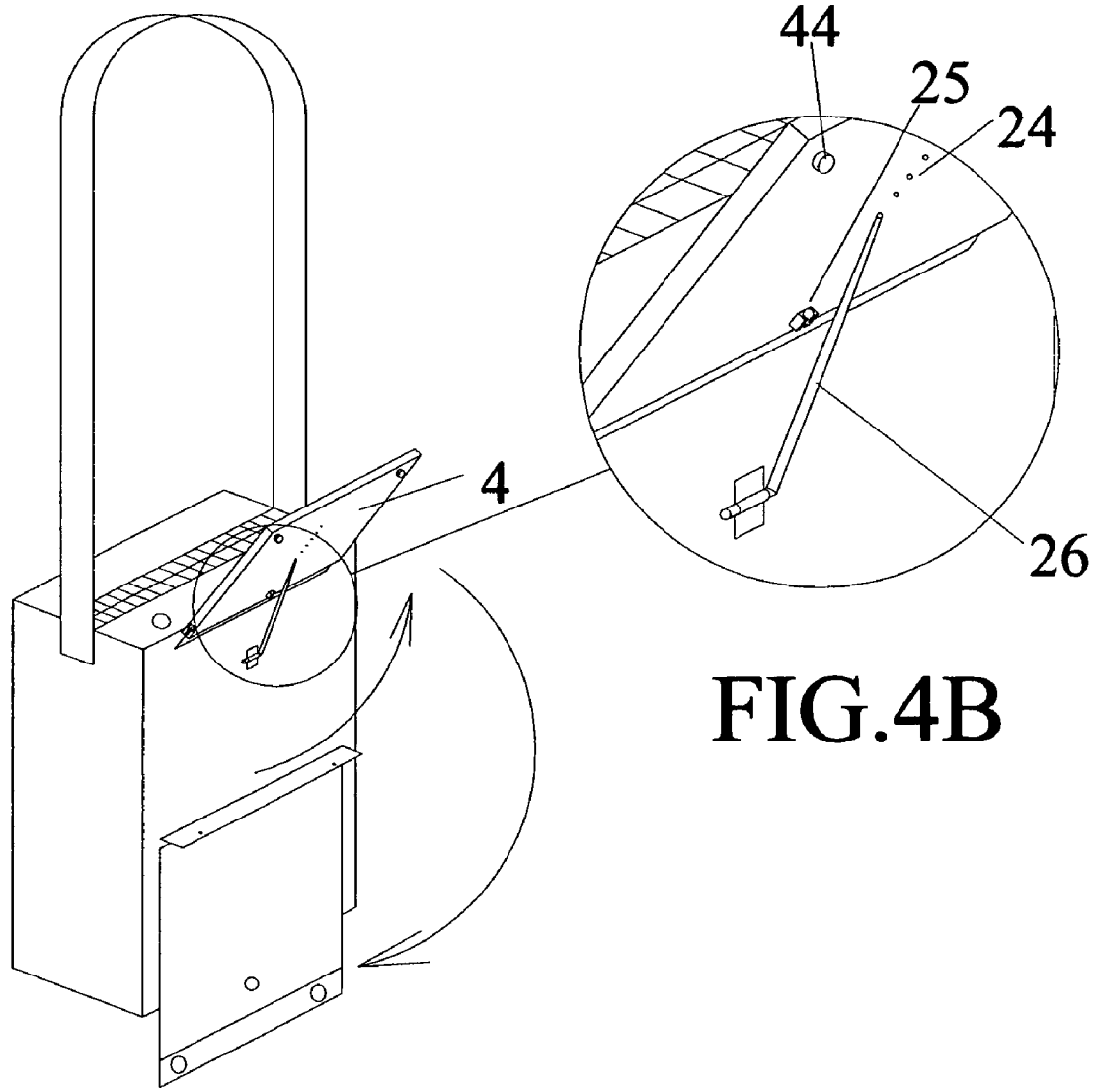
FIG. 4A This is the bag computer with the display panel having fixtures for a display panel prop.
FIG. 4B This drawings shows magnified view of the adaptations to the display back to accommodate a display prop.

The display panel back side may be adapted to be used with a display panel prop which removably props between the bag front and display panel back to hold the panel at various angles. Shown in FIGS. 4A and 4B, one or more display back side 4 display prop receptacles 24 may be inset into the display panel or may project out and may jam 24, snap or hook into a matching display panel prop bar 26 end so that the two are removably fixed together and the display panel held in a set angular position. Several display back fixtures are properly spaced to prop up the display in the most commonly used positions. The display back fixtures for holding the display near vertical 25 may be different and may be adapted to holding the display with the bar parallel to the display back side. This vertical holding fixture may be partially or wholly inset into the display panel and/or clamp. The display back side prop fixtures may be part of the finger guides or part of a finger guide frame that removably attaches to the display panel and may hold the pointing device part and display part of the display panel together. When no propping is needed, the bar just hangs on the bag front behind the display panel. To allow the display to lay flat against the bag front even with the prop between the display back and bag front, the proximal attachment edge and/or back of the display panel may be shaped, notched or cut away to fit the prop base, hinge and/or bar. The display back may include perimeter edges extended toward the bag front when in stored position to provide space between the display back and bag front for a display prop or to protect controls and to allow the display to lie against the bag front. The display back may include one or more bumpers 44 or cushions to absorb the shock of the display panel falling into stored position and to provide space between the display panel and bag front for the display prop.

Alternatively, the prop bar may pass through a sliding holder such as a channel, track, slot or hole parallel to the display panel back side which is fixed to the display panel back side. The sliding holder may have a friction or ratchet surface within it so that the display panel can hold any angular position. Instead of friction, there may be a lock associated with the sliding holder and the operator can engage the lock if he wants the display to hold one angular position.

The positions of the prop and sockets/channel may be reversed. In other words, the prop bar may be on the display back and the matching sockets or channel may be on the bag front.

One of the simplest means to pivotally attach the display panel to the bag is to use a clamp attachment on the proximal attachment edge of the display panel to clamp onto one or more pivoting computer equipment mounts consisting of short flexible fabric attachment flaps or pivoting flange on the bag. The clamp attachment may consist of one clamp or may be two or more clamps pivoting on the same horizontal axis. The clamp attachment also provides a thickened and reinforced area on the edge closest to the bag and the one most likely to be stressed. For mounting a display to the bag, the bag's attachment flap or pivoting flange would be located near the junction of the bag's front and top walls so the installed display can lay approximately flat against the bag front when stored or pivot with its display facing outward into the line of sight of the operators when in use. The attachment flap may be short and about the width of the display panel so as to match the clamp in terms of shape, length, width and thickness. To match and removably secure to the flap, the clamp jaws are adapted to fit a plane surface such as a flap. The clamp jaws may be shaped to match the curve of a flexed plane, such as is formed when a flap is bent, so that the clamp may fit best with the shape of the top front corner of the bag when installed. The clamp jaws may be angled and/or extended away from the display panel to allow the display to lay flat against the bag front even if there is a display prop on the bag front or if the bag has bulge from cargo carried in the bag. The clamp jaws may have features, such as pins or ridges, matching the attachment flap.

Figures 5A, 5B:
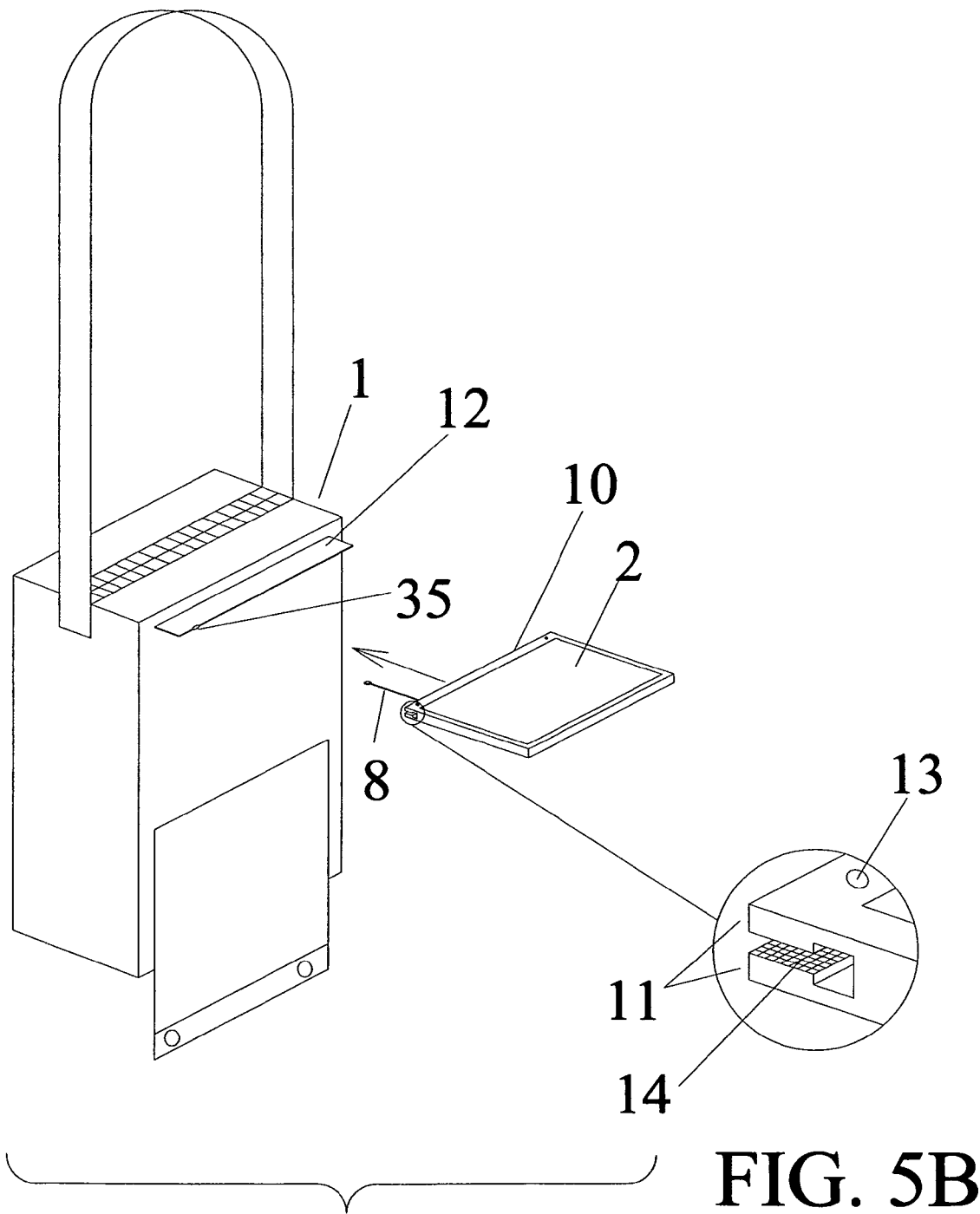
FIG. 5A This is the removable display with clamp attachment shown ready to attachments to a bag front flap attachment.
FIG. 5B This is a magnified view of the clamp jaw area of the display with clamp attachment. The jaws are formed in one piece.

As shown in FIGS. 5A and 5B, the attachment holding the display panel to the bag may consist of one or more attachment clamps 10 on the proximal edge. The clamp has two jaws 11 between which the bag's hinge means 12, such as short flexible fabric attachment flap or flange from a hinge means, is clamped. The jaws may be tightened with a clip, screws or other fastener means 13. As shown in FIG. 5B, the jaws may be made of one molded piece with a fastener to tighten the jaws around the bag's hinge means. The clamp should be made of a material flexible enough to bend and clamp when fastened. The hinge means would usually be a flexible fabric so it can easily be sews or riveted to the bag front. There may be a gap, channel, notch or other cut out in the clamp area to allow an electrical connection, for example a wire with plug at the end 8, to pass from the display panel proximal attachment edge, between the clamp jaws, through an opening 35 in two layers of the bag's attachment flap, through the bag's front wall and to the interior of the bag to connect with inside mounted computer or peripherals without pinching the wire in the clamp when it is tightened around the attachment flap. A wire leading from the display panel proximal attachment edge may be positioned anywhere on the display panel proximal attachment edge. For example, the wire connection may be toward one side of the proximal attachments edge to lead through the bag and connect to a plug on the computing unit side edge.

As shown in alternative jaw configuration, FIGS. 6A and 6B, the proximal edge clamp attachment 10 may also have two separate jaws. One or both of these jaws 11 may be hinged 15 together so they can be opened to accept the bag hinge means attachment flap or flange 12. The jaws may have a spring to hold the jaws closed. Screws, bolts, releasable clips, pins, snaps or other fasteners may be included to hold the jaws closed and there may be release buttons which may be recessed to avoid accidental release. Shown in FIG. 7, in an alternate jaw form, one of the jaws may be a pivoting cam jaw or other eccentric pinch bar with a lever to jam and clamp the attachment material. To tighten and lock the jaws in place at the same time, the clamp has a longer lever 34 for tightening and a short lever or cam apogee 33, at an angle of about 90 degrees from the long lever, which pinches the clamped material against the other clamp jaw when the long lever is pivoted. This type of clamp allows installation without the use of a tool.

As shown in alternative jaw configuration, FIGS. 8A and 8B, the proximal edge clamp attachment 10 may have one removable jaw 11 and this may be tightened to the other jaw with screws, bolts, releasable clips, pins, snaps or other fasteners 13. FIG. 9 shows an alternative jaw configuration with the jaws curved to best fit the shape of the top front corner of the bag. In this arrangement, applicable to all display clamp attachments, the clamp jaws match the curve of a flexed plane such as is formed when a flap is bent. FIG. 10 shows that the clamp area may be angled to best fit the shape of the top front corner of the bag and/or extended 46 beyond the panel's back side surface plane, to provide space behind the display for a display prop and/or assist in making the display panel lay flat against the bag front.

The inside of the clamp jaws may be shaped to match the bag's hinge means. The jaws may form a channel FIG. 6B 16 to match a bar, rope or thickened hem or other ledge on the hinge means edge. The jaws may have knurling FIG. 5B 14, teeth or ridges to grip a plain flexible fabric hinge means such as an attachment flap. The jaws may have matching projections and sockets/holes to match perforations in the bag's hinge means.

Figures 11A, 11B:
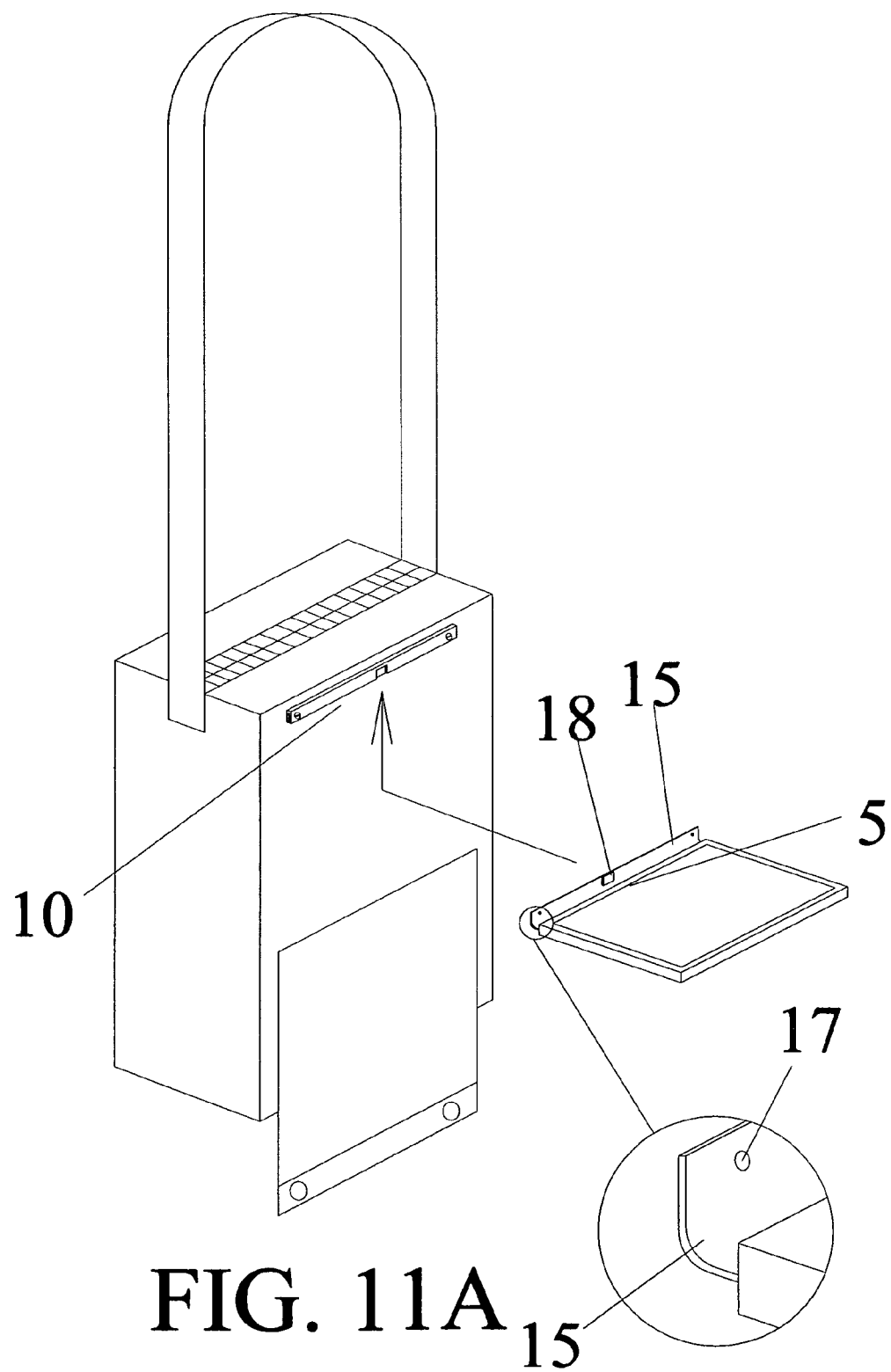
FIG. 11A This is the removable display with slot attachment shown ready to attachment to a bag front flap attachment with bar matching the slot.
FIG. 11B This is a magnified view of the clamp jaw area of the display with slot attachment shown ready to attachment to a bag front flap attachment with bar matching the slot.

Alternatively, as shown in FIGS. 11A and 11B, the clamp 10 may be located on the bag front or top near the junction of the top and front bag walls and meant to match and removably attach to a hinge means 15 clamped, screwed crimped or otherwise permanently fastened to the display panel's proximal attachment edge 5. The hinge means may be made of flexible fabric permanently clamped or crimped to the display panel and of a shape size and thickness to match the bag's clamp. The flexible fabric hinge means may be plain and adapted, in terms of length, width and thickness, to match a stationary clamp 10 on the outside front wall of the computer bag. The flexible fabric or hinge flange may have perforations 17 to match projections in the bag's clamp jaws. The fabric or flange may have a bar, rope or thickened hem or other ledge on its edge to match a channel or other feature in the bag's clamp jaws and help hold the bag and display panel together. Flexible fabric may be double layered and there may be electrical wiring passing from the display panel between the layers to either a connecting plug on the bag clamp or through the bag wall and clamp area directly to computer equipment on the interior of the bag.

Instead of one broad clamp, there may be two clamps, one on the right and one on the left sides of the display panel's proximal attachment edge. Each clamp may have the same attributes, including the electrical connection, as a single attachments flap, as described above. Two attachments may have improved characteristics while holding cargo which makes the bag front bulge.

The preferred embodiments of the invention described herein are exemplary and numerous modifications, variations, and rearrangements can be readily envisioned to achieve an equivalent result, all of which are intended to be embraced within the scope of the appended claims.

The invention claimed is:

1. A display apparatus for pivotally mounting and operating on a bag comprising:
    a. a display panel comprising a front side, a back side, an attachment edge, and a distal edge;
    b. a display on the front side of the display panel; and
    c. one or more attachments on or near the attachment edge to removably attach the display panel to the bag and pivot around the attachment edge wherein each attachment comprises one or more clamps to match and attach to one or more bag attachment flaps or pivoting flanges.

2. The apparatus of claim 1, further comprising a computing unit inside the display panel.

3. The apparatus of claim 1, further comprising a manual control on the display panel.

4. The apparatus of claim 3, wherein the control comprises one or more pointing devices on the back side of the display panel.

5. The apparatus of claim 4 wherein the pointing device is a touch pad.

6. The apparatus of claim 1 wherein the front side of the display panel is removably attached to the back side of the display panel, and further comprising a pointing device attached to the back side of the display panel.

7. The apparatus of claim 1 wherein the display panel back side further comprises at least one fixture, the fixture arranged to accommodate a display panel prop movably positioned between the display panel back side and a bag front and to hold the display panel in a selected angular position.

8. The apparatus of claim 1 wherein the display panel is shaped to conform to a bag front and compensate for a bag bulge.

9. The apparatus of claim 1, further comprising an electrical connection, the electrical connection near the attachment edge and configured to provide a conduit to electrically connect the display panel to a computing unit or a peripheral device located inside the bag.

10. The apparatus of claim 9, wherein the electrical connection is a wire including a distal plug.

11. The apparatus of claim 10, wherein the attachment edge of the display panel is further comprised of a gap, channel, notch or other cut out in the clamp adapted for passing the wire connection through the clamp.

12. The apparatus of claim 1, wherein the clamp is comprised of first and second jaws.

13. The apparatus of claim 12, wherein one of the first and second jaws is removable-removably secured to the display panel.

14. The apparatus of claim 12, wherein the first and second jaws are hinged together.

15. The apparatus of claim 14, wherein the first jaw is further comprised a lever wherein the first jaw is adapted to pinch a material against the second jaw when the lever is pivoted.

16. The apparatus of claim 12, wherein the first and second jaws are formed as one piece.

17. The apparatus of claim 1, further comprising at least one of a camera and infrared antenna on the display panel.

18. The apparatus of claim 1, further comprising at least one bumper on the back side of the display panel.

19. A display apparatus for pivotally mounting and operating on a bag comprising:
    a. a display panel comprising a front side, a back side, an attachment edge, and a distal edge;
    b. a display on the front side of the display panel;
    c. one or more attachments on or near the attachment edge removably attach the display panel to the bag and pivot around the attachment edge.

20. The apparatus of claim 19, further comprising a computing unit inside the panel.

21. The apparatus of claim 19, further comprising a manual control on the display panel.

22. The apparatus of claim 21, wherein the control comprises one or more pointing devices on the back side of the display panel.

23. The apparatus of claim 22 wherein the pointing device is a touch pad.

24. The apparatus of claim 19 wherein the front side of the display panel is removably attached to the back side of the display panel, and further comprising a pointing device attached to the back side of the display panel.

25. The apparatus of claim 19 wherein the display panel back side further comprises at least one fixture, the fixture arranged to accommodate a display panel prop movably positioned between the display panel back side and a bag front and to hold the display panel in a selected angular position.

26. The apparatus of claim 19, wherein the display panel is shaped to conform to a bag front and compensate for a bag bulge.

27. The apparatus of claim 19, further comprising an electrical connection, the electrical connection near the pre attachment edge and configured to provide a conduit to electrically connect the display panel to a computing unit or a peripheral device located inside the bag.

28. The apparatus of claim 27, wherein the electrical connection is a wire including a distal plug.

29. The apparatus of claim 19, further comprising at least one of a camera and infrared antenna on the display panel.

30. The apparatus of claim 19, further comprising at least one bumper on the back side of the display panel.

31. A display apparatus for pivotally mounting and operating on a bag comprising:
    a. a display panel comprising a front side, a opposite back side, an attachment edge, and a distal edge;
    b. a display on the front side of the display panel;
    c. a pointing device on the display panel; and
    d. one or more attachments on or near the attachment edge to removably attach the display panel to the bag and pivot around the attachment edge.

32. The apparatus of claim 31, further comprising an electrical connection, the electrical connection near the attachment edge and configured to provide a conduit to electrically connect the display panel to a computing unit or a peripheral device located inside the bag.

33. The apparatus of claim 32, wherein the electrical connection is a wire including a distal plug.

34. The apparatus of claim 31 wherein the pointing device is a touch pad.

35. The apparatus of claim 31 wherein the front side of the display panel is removably attached to the back side of the display panel, and further comprising a pointing device attached to the back side of the display panel.

36. The apparatus of claim 31 wherein the display panel back side further comprises at least one fixture, the fixture arranged to accommodate a display panel prop movably positioned between the display panel back side and a bag front and to hold the display panel in a selected angular position.

37. The apparatus of claim 31, further comprising at least one of a camera and infrared antenna on the display panel.

38. The apparatus of claim 31, further comprising at least one bumper on the back side of the display panel.

39. The apparatus of claim 31 wherein the pointing device is located on the back side.

\* \* \* \* \*